(12) United States Patent
Hashimoto

(10) Patent No.: US 7,124,306 B2
(45) Date of Patent: Oct. 17, 2006

(54) POWER ON/OFF CIRCUIT APPARATUS HAVING A RESET FUNCTION

(75) Inventor: Chiaki Hashimoto, Anan (JP)

(73) Assignee: Funai Electric Co., Ltd., Osaka (JP)

( * ) Notice: Subject to any disclaimer, the term of this patent is extended or adjusted under 35 U.S.C. 154(b) by 725 days.

(21) Appl. No.: 09/839,532

(22) Filed: Apr. 20, 2001

(65) Prior Publication Data

US 2001/0054160 A1    Dec. 20, 2001

(30) Foreign Application Priority Data

Apr. 21, 2000 (JP) .............................. 2000-120428

(51) Int. Cl.
*G06F 1/30* (2006.01)

(52) U.S. Cl. ..................................... 713/300

(58) Field of Classification Search ................. 713/300
See application file for complete search history.

(56) References Cited

U.S. PATENT DOCUMENTS

| | | | | |
|---|---|---|---|---|
| 4,591,914 A | | 5/1986 | Hakamada et al. | |
| 5,003,192 A | * | 3/1991 | Beigel | 307/140 |
| 5,077,551 A | * | 12/1991 | Saitou | 345/207 |
| 5,761,609 A | * | 6/1998 | Chen | 455/26.1 |
| 6,601,181 B1 | * | 7/2003 | Thomas | 713/340 |
| 6,625,739 B1 | * | 9/2003 | Kobayashi | 713/310 |

FOREIGN PATENT DOCUMENTS

| | | |
|---|---|---|
| JP | 57204592 | 6/1956 |
| JP | 60-160333 | 8/1985 |
| JP | 04-333119 | 11/1992 |
| JP | 11-327706 | 11/1999 |
| JP | 2000-010666 | 1/2000 |

* cited by examiner

*Primary Examiner*—Lynne H. Browne
*Assistant Examiner*—Eric Chang
(74) *Attorney, Agent, or Firm*—Darby & Darby

(57) ABSTRACT

In a power on/off circuit apparatus, if a microcomputer malfunctions, an on/off operation of a power switch is executed, and thereby, the microcomputer is reset. A non-volatile memory stores an operating state of components just before the power switch is operated. Therefore, if the microcomputer malfunctions, without unplugging an AC cord, it is possible to reset the microcomputer by the power switch, and thus, to carry the components from a state just before the reset to the next operating state.

9 Claims, 4 Drawing Sheets

POWER ON/OFF CIRCUIT APPARATUS HAVING A RESET FUNCTION

BACKGROUND OF THE INVENTION

1. Field of the Invention

The present invention relates to a power on/off circuit apparatus, which can turn on/off a power supply from an external power source to each electronic device based on an operation input of power switch, in electronic devices including a microcomputer.

2. Description of the Related Art

Conventionally, in electronic devices such as a DVD (digital video disc) player, a DVD-ROM (digital video disc-read only memory) drive and the like, when these devices are connected to an AC (alternating current) power source, a power is always supplied to a microcomputer. The microcomputer carries out a key scan sensing operation of a key matrix on which various input keys including a power switch are arranged, and then, makes an on/off control of power supply to individual electronic components when the power switch is operated.

Moreover, even when the power supplied to individual electronic components is turned off, the microcomputer is operating; in other words, these electronic components are operating in a power saving mode (key scan sensing operation is still continuing).

By the way, when the microcomputer hangs up due to any factors, key scan sensing operation is impossible, and even when the power switch is operated, the power of the these components is not turned off. For this reason, an AC code must be plugged out and in of a receptacle (plug socket) in order to cancel the above hang-up of the microcomputer.

In the case where the microcomputer makes a malfunction, there is a well-known technique of resetting the microcomputer without plugging the AC code out of the receptacle (e.g., refer to Japanese Unexamined Utility Model Publication No. SHO 57-204592).

However, according to the prior art disclosed in the above Publication, in the case where the microcomputer is reset by the power switch making a malfunction, the state of electronic components operating just before is lost; for this reason, a user must start the operation of electronic components at the beginning. Therefore, the user has a misunderstanding of making a power-on operation in spite of making a power-off operation from the power-on state by operating the power switch; as a result, the user has a strange feeling that something is wrong. Moreover, the electronic components are not operating in a power saving mode (key scan sensing operation is still continuing).

SUMMARY OF THE INVENTION

The present invention has been made in order to solve the above problems in the prior art. It is, therefore, an object of the present invention to offer a power on/off circuit apparatus, which can reset a microcomputer by a power switch without plugging an AC code out of a receptacle when the microcomputer makes a malfunction, and can memorize an operating state of components just before reset so as to start operating from the state before reset without a strange feeling.

In order to achieve the above object, according to one aspect, the present invention provides a power on/off circuit apparatus, comprising:

a power on/off circuit for controlling an on/off of power supply to electronic components from an external power source;

a microcomputer for controlling the power on/off circuit based on an operation input of a power switch, a reset circuit for giving a reset signal to a reset terminal of the microcomputer when a power is supplied to the microcomputer; and a non-volatile memory for storing a power on/off information just before the power switch is operated, the power switch being connected to the reset terminal.

With the above construction, the microcomputer controls the power on/off circuit based on an operation input of the power switch, and carries out an on/off control of power supply to electronic components from an external power source.

In the case where the microcomputer runs away, when the on/off operation of the power switch is carried out, the microcomputer is reset, and further, an operating state of components just before the power switch is operated is stored in the non-volatile memory. Therefore, it is possible to transfer the components from a state of the equipment just before the operation to the next operation.

Moreover, preferably, when the power switch is operated, the microcomputer reads a power on/off information of the non-volatile memory so as to determine a power on/off state just before the power switch is operated, and writes a power-on information to the non-volatile memory while making a power-on operation if the microcomputer is in a power-off state. Further, the microcomputer writes a power-off information to the non-volatile memory while making a power-off operation if the microcomputer is in a power-on state.

By doing so, in the case where the state just before the power switch is operated is a power-on state, the microcomputer enters a power-off state.

Moreover, the power on/off circuit apparatus further includes a power circuit connected to an AC power source, and the power on/off circuit uses an output of the power circuit as a power source.

The microcomputer uses an output of the power circuit as a power source, and senses a key scan of a key matrix on which various input keys except the power switch are arranged, regardless of the on/off of power supply to electronic components by the power on/off circuit. By doing so, so long as the power circuit is connected to the AC power source, even if the power supply to electronic components is in an off state, the microcomputer is in a state capable of sensing a key scan in a power saving mode.

DETAILED DESCRIPTION OF THE INVENTION

Figure 1:
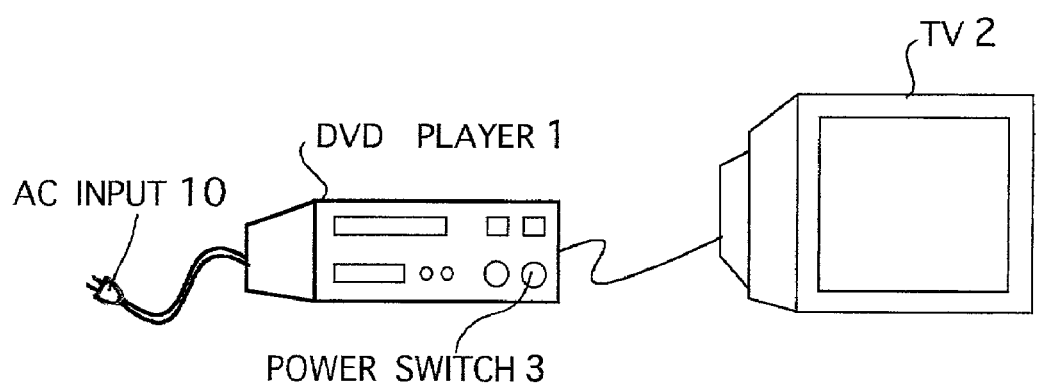
FIG. 1 is a view showing an example using an electronic device including a power on/off circuit apparatus according to one embodiment of the present invention.
Figure 2:
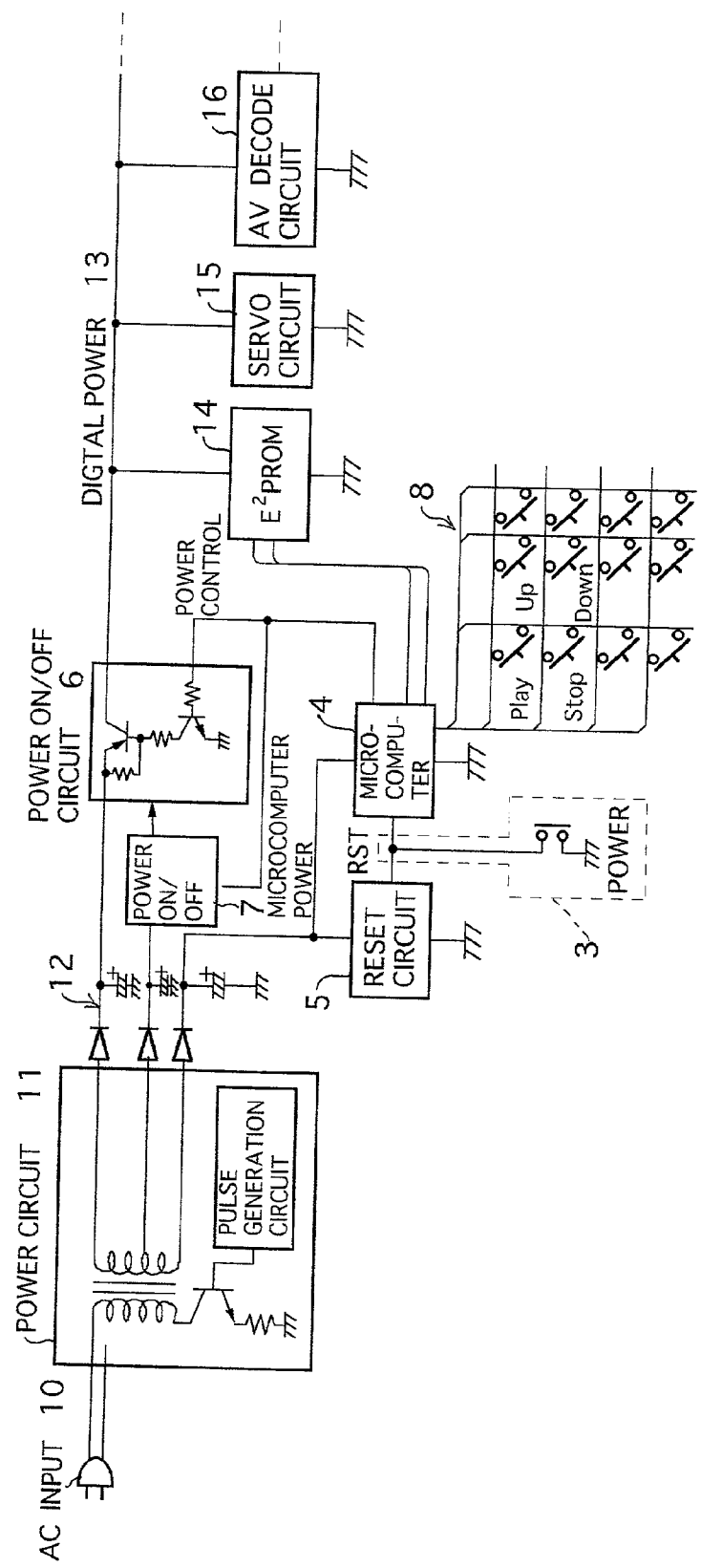
FIG. 2 is a circuit diagram showing a configuration of the power on/off circuit apparatus.

One preferred embodiment of a power on/off circuit apparatus according to the present invention will be detailedly described below with reference to the accompanying drawings. FIG. 1 is a view showing an example using a DVD player (one of electronic devices) including a power on/off circuit apparatus, and FIG. 2 is a circuit diagram showing a configuration of the power on/off circuit apparatus. The DVD player 1 has an AC input 10, a power switch 3, and a reproduction output terminal is connected to a color TV 2. The power on/off circuit apparatus includes a microcomputer 4, a reset circuit 5, and power on/off circuits 6 and 7.

More specifically, the microcomputer 4 controls a predetermined operation based on various input key detection, and the reset circuit 5 gives a reset signal to a reset terminal RST of the microcomputer 5, and further, the power on/off circuits 6 and 7 turn on and off the power supply to each section of the DVD player.

The microcomputer 4 senses (detects) a key scan of a key matrix 8 on which various input keys except the power switch 3 are arranged, and further, controls an on/off control of the power on/off circuits 6 and 7 in accordance with the operation input of the power switch 3 (power control).

The power switch 3 is connected to the reset terminal RST, and then, short-circuits the reset terminal RST to GDN when being depressed.

A power circuit 11 receives a power supply from the AC input 10 comprising an AC code connected to an external AC power receptacle, and then, an output of the power circuit 11 is generated as a direct current power source by a rectifier circuit 12.

Further, the power on/off circuits 6 and 7 is connected to the direct current power source, and then, when the power on/off circuit 6 is turned on, a digital power 13 is supplied.

The digital power 13 is connected with an E2 PROM (non-volatile memory) 14, a servo circuit 15, an AV decode circuit 16, and other components (e.g., 5.5V line).

The power on/off circuit 7 is a circuit equal to the above power on/off circuit 6, and supplies a digital power to other components (e.g., 3.3V line).

In addition, the above direct current power source is used as a power source of the reset circuit 5 and the microcomputer 4.

The E2PROM 14 is provided with a register for storing a parental lock data, which is one of DVD player functions and stop memory information, and a power on/off information just before the power switch 3 is operated. The microcomputer 4 carries out information write and read with respect to the E2PROM 14.

Figure 3:
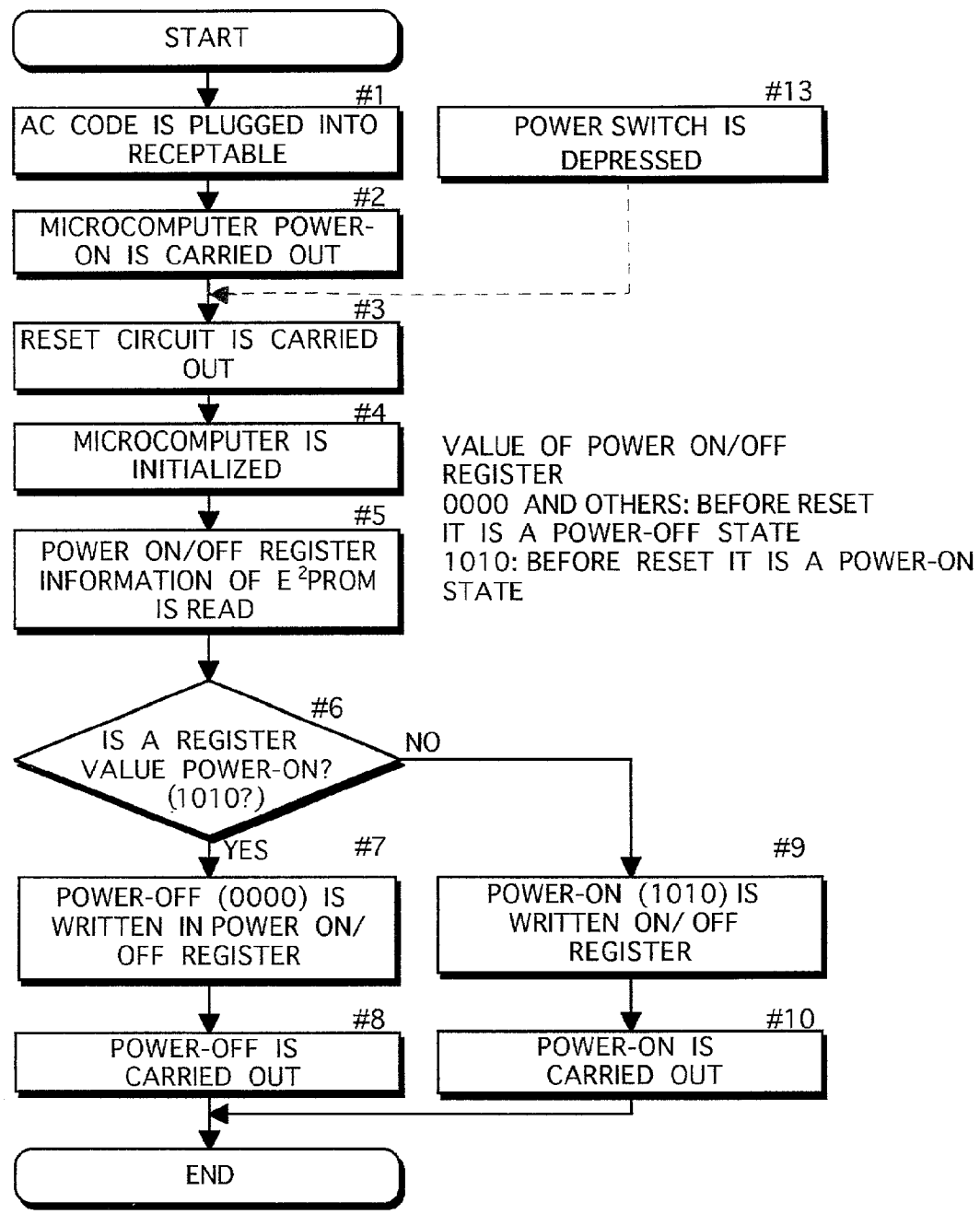
FIG. 3 is a flowchart in the power on/off circuit apparatus.

The procedure of the operation made by the microcomputer 4 in the above configuration will be described below with reference to a flowchart of FIG. 3

The AC input 10 (AC code) is plugged into the AC power source receptacle (#1) so as to turn on the power of the microcomputer 4 (#2).

By doing so, the reset circuit 5 is operated (#3), and then, the microcomputer 4 is initialized (#4).

The microcomputer 4 reads power on/off register information of the E2 PROM 14 (#5), and then, determines whether or not a register value is power-on (e.g., 1010).

Unless the register value is power-on (NO in step #6), the power-on information (1010) is written in the power on/off register of the E2 PROM 14 (#9), and further, a power-on operation is carried out (#10).

By the power-on operation, the microcomputer enters a power-on state, if the operation state just before the power switch 3 is operated is a power-off state.

On the other hand, if the register value is power-on (YES in step #6), the power-off information (0000) is written in the power on/off register of the E2PROM 14 (#7), and further, a power-off operation is carried out (#8). By the power-off operation, the microcomputer enters a power-on state, if the operation state just before the power switch 3 is operated is a power-on state.

In this case, the above power-on operation in steps #10 and #8 is equivalent to the power control with respect to the power on/off circuit 6.

Now, in the case where the microcomputer 4 hangs up due to any factors during the operation of components, in order to cancel the hang-up, the power switch 3 is depressed (#13).

Figure 4:
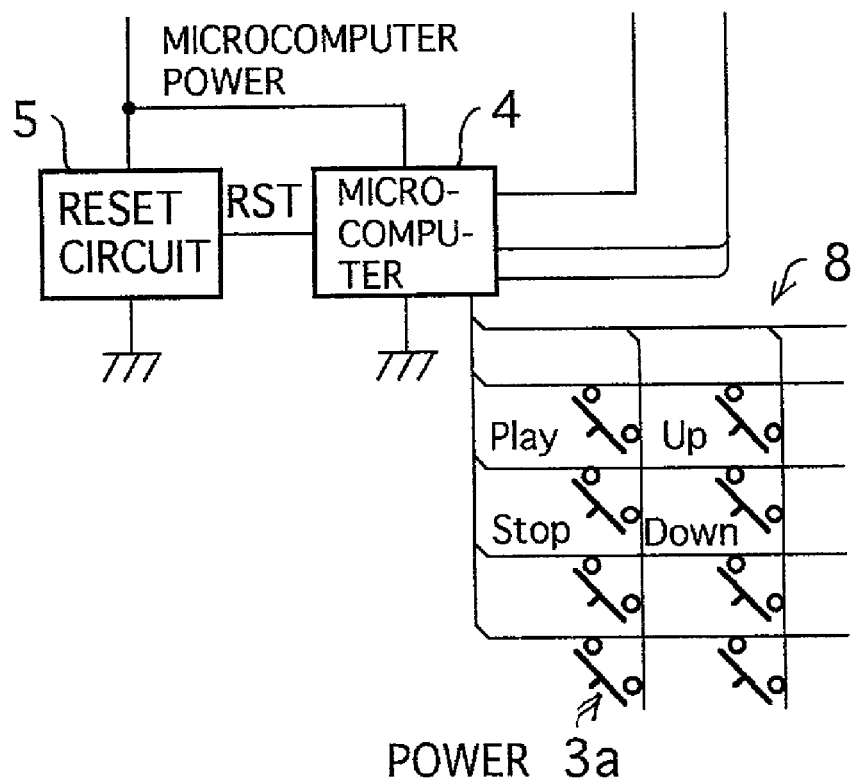
FIG. 4 is a view partially showing a conventional power on/off circuit apparatus.

By doing so, an interruption enters the step #3, and then, the reset circuit 5 is operated so as to reset the microcomputer 4, and thereafter, the procedure same as above is carried out. In order to make a comparison with the present invention, a conventional power on/off circuit apparatus will be described below with reference to FIG. 4.

In the conventional power on/off circuit apparatus, a power switch 3a is provided on the key matrix 8 of the microcomputer 4. For this reason, when the microcomputer 4 hangs up, key scan sensing operation is impossible; as a result, even when depressing the power switch 3a, the microcomputer is still hanging up.

In order to cancel the hang-up of the microcomputer 4, there is no other way of plugging the AC code out and in of the receptacle.

On the contrary, according to the present invention, as shown in FIG. 2, the power switch 3 is not provided on the key matrix 8, and provided on the reset terminal RST of the microcomputer 4; therefore, it is possible to solve the above problem in the prior art.

Moreover, the microcomputer 4 is, regardless of the power supply of equipment a power on/off circuit 6 turned on or off, in a state capable of sensing a key scan of the key matrix 8 on which various input keys except the power switch 3 are arranged; therefore, electronic components are operating in a power saving mode.

What is claimed is:

1. A power on/off circuit apparatus, comprising:
   a power on/off circuit for controlling an on/off supply of power to electronic components from an external power source;
   a microcomputer connected to the power on on/off circuit for controlling said power on/off circuit based on an operation input of a power switch;
   a reset circuit for giving a reset signal to a reset terminal of the microcomputer when a power is supplied to said microcomputer; and
   a non-volatile memory for storing power on/off information just before said power switch is operated, the power on/off circuit connected to the non-volatile memory for controlling the on/off supply of power to the non-volatile memory, and said power switch being connected to said reset terminal.

2. The power on/off circuit apparatus according to claim 1, wherein when said power switch is operated, said microcomputer reads the power on/off information of said non-volatile memory to determine a power on/off state just before the power switch is operated, and writes a power-on information to said non-volatile memory while making a power-on operation if the microcomputer is in a power-off state, or, writes a power-off information to said non-volatile memory while making a power-off operation if the microcomputer is in a power-on state.

3. The power on/off circuit apparatus according to claim 1, further comprising:
a servo circuit connected to the power on/off circuit; and
an AV decoder circuit connected to the power on/off circuit.

4. An electronic device including:
a power on/off circuit for controlling an on/off supply of power to electronic components of the device from an external power source;
a microcomputer connected to the power on/off circuit for controlling said power on/off circuit based on an operation input of a power switch;
a reset circuit for giving a reset signal to a reset terminal of the microcomputer when a power is supplied to said microcomputer;
a non-volatile memory for storing a power on/off information just before said power switch is operated, the power on/off circuit connected to the non-volatile memory for controlling the on/off supply of power to the non-volatile memory, and said power switch being connected to said reset terminal, and
a power circuit connected to an AC power source and connected to the on/off circuit,
wherein said power on/off circuit uses an output of said power circuit as a power source, and said microcomputer uses an output of said power circuit as a power source, and senses a key scan of a key matrix on which various input keys except said power switch are arranged, regardless of the on/off of power supply to the electronic components by sad power on/off circuit.

5. The electronic device according to claim 4, further comprising:
a power circuit connected to an AC power source; anti
another power on/off circuit connected to the power circuit for controlling the on/off supply of power of a different level to other electronic components not connected to the first-mentioned power on/off circuit, and said microcomputer connected to the second-mentioned power on/off circuit for controlling the second-mentioned power on/off circuit.

6. A power on/off circuit apparatus, comprising:
a power on/off circuit for controlling an on/off supply of digital power to electronic components from an external power source;
a microcomputer connected to the power on/off circuit for controlling said power on/off circuit;
a power switch connected to a reset terminal of the microcomputer, said microcomputer configured to control said power on/off circuit based on an operation input of the power switch;
a reset circuit for giving a reset signal to the reset terminal of the microcomputer when a power is supplied to said microcomputer; and
a non-volatile memory for storing a power on/off information just before said power switch is operated, the power on/off circuit connected to the non-volatile memory for controlling the on/off supply of digital power to the non-volatile memory,
wherein the electronic components include:
a servo circuit connected to the power on/off circuit; and
an AV decoder circuit connected to the power on/off circuit.

7. The power on/off circuit apparatus according to claim 6, further comprising:
a power circuit connected to an AC power source; and
another power or/off circuit connected to the power circuit for controlling the on/off supply of digital power of a different level to other electronic components not connected to the first-mentioned power on/off circuit, and the microcomputer connected to the second-mentioned power on/off circuit for controlling the second-mentioned power or/off circuit.

8. A power on/off circuit apparatus, comprising:
a power on/off circuit for controlling an on/off supply of power to electronic components from an external power source;
a microcomputer connected to the power on/off circuit for controlling said power on/off circuit based on an operation input of a power switch,
a reset circuit for giving a reset signal to a reset terminal of the microcomputer when a power is supplied to said microcomputer;
a non-volatile memory for storing power on/off information just before said power switch is operated, the power on/off circuit connected to the non-volatile memory for controlling the on/off supply of power to the non-volatile memory, and said power switch being connected to said reset terminal; and
a power circuit connected to an AC power source,
wherein said power on/off circuit uses an output of said power circuit as a power source, and said microcomputer uses an output of said power circuit as a power source, and senses a key scan of a key matrix on which various input keys except said power switch are arranged, regardless of the on/off of power supply to the electronic components by said power on/off circuit,
wherein when said power switch is operated, a reset terminal of said microcomputer is connected to a GND, and said microcomputer is reset to resolve a hang-up of the microcomputer,
wherein when the electronic components are operating in a power saving mode, said power on/off circuit prevents supplying power to the electronic components, and said microcomputer senses a key scan of the key matrix other than said power switch.

9. The power on/off circuit apparatus according to claim 8, further comprising:
another power on/off circuit connected to the power circuit for controlling the on/off supply of power of a different level to other electronic components not connected to the first-mentioned power on/off circuit, and the second-mentioned power on/off circuit being connected to the microcomputer for being controlled by the microcomputer.

* * * * *